United States Patent
Trott

(10) Patent No.: US 7,232,174 B1
(45) Date of Patent: Jun. 19, 2007

(54) ADJUSTABLE VEHICLE SEAT FOR PROVIDING LATERAL TORSO SUPPORT

(76) Inventor: Gregory L. A. Trott, PO Box 446, Warwick (BM) WK-03

( * ) Notice: Subject to any disclaimer, the term of this patent is extended or adjusted under 35 U.S.C. 154(b) by 114 days.

(21) Appl. No.: 11/103,288

(22) Filed: Apr. 11, 2005

(51) Int. Cl.
 *B60N 2/22* (2006.01)
 *A47C 7/14* (2006.01)
 *A47C 7/40* (2006.01)
 *A47C 7/46* (2006.01)

(52) U.S. Cl. .................... 296/65.17; 297/284.9
(58) Field of Classification Search .............. 296/63, 296/65.01, 65.16, 65.17; 297/284.9
 See application file for complete search history.

(56) References Cited

U.S. PATENT DOCUMENTS

| | | | |
|---|---|---|---|
| 3,761,126 A | 9/1973 | Mulholland | |
| 4,537,444 A * | 8/1985 | Maruyama et al. | 297/284.9 |
| 4,603,903 A | 8/1986 | Moscovitach | |
| 4,615,561 A * | 10/1986 | Nomura | 297/243 |
| 4,732,423 A | 3/1988 | Condon | |
| 4,885,513 A * | 12/1989 | Sakamoto et al. | 297/284.9 |
| 4,924,162 A * | 5/1990 | Sakamoto et al. | 297/284.9 |
| 4,924,163 A * | 5/1990 | Sakamoto et al. | 318/569 |
| 5,163,737 A | 11/1992 | Navach et al. | |
| 5,366,277 A | 11/1994 | Tremblay | |
| D356,694 S | 3/1995 | Armbrecht | |
| 5,425,569 A * | 6/1995 | Hayes | 297/452.35 |
| 5,758,926 A | 6/1998 | Wilkie et al. | |
| 5,816,659 A * | 10/1998 | Wolf | 297/452.1 |
| 6,371,545 B1 * | 4/2002 | Yang | 296/63 |
| 7,125,077 B2 * | 10/2006 | Frank | 297/284.9 |
| 7,140,680 B2 * | 11/2006 | McMillen et al. | 297/284.9 |
| 7,140,681 B2 * | 11/2006 | McMillen | 297/284.9 |
| 2001/0048058 A1 * | 12/2001 | Folliot et al. | 248/429 |
| 2006/0250008 A1 * | 11/2006 | Kohl et al. | 297/284.9 |

FOREIGN PATENT DOCUMENTS

| | | | | |
|---|---|---|---|---|
| EP | 328137 A2 * | 8/1989 | | 296/63 |
| GB | 2081086 A * | 2/1982 | | 297/284.9 |
| JP | 01028041 A * | 1/1989 | | 297/216.1 |
| JP | 2000006695 A * | 1/2000 | | 297/344.21 |

* cited by examiner

Primary Examiner—D. Glenn Dayoan
Assistant Examiner—Paul Chenevert

(57) ABSTRACT

An adjustable seat includes a support bracket secured to a vehicle floor panel and a lower and upper portion pivotally connected thereto. The upper portion includes a plurality of lateral wing portions and each wing includes an elongated rod extending along a longitudinal length thereof. The lower and upper portions have an outer layer formed from resilient material. A mechanism is included for selectively pivoting the wing portions in sync about the respective rods such that the width of the upper portion can be adapted. Such a pivoting mechanism extends between the lower and upper portions and is adjacent to a rear side of the seat.

6 Claims, 7 Drawing Sheets

ADJUSTABLE VEHICLE SEAT FOR PROVIDING LATERAL TORSO SUPPORT

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a vehicle seat and, more particularly, to an adjustable vehicle seat for providing lateral torso support.

2. Prior Art

Various types of complex vehicle seating systems or upright support systems having various adjustable mechanisms are well known in the prior art for supporting a person driving in a vehicle. However, such vehicle seats are complex in construction, expensive to fabricate, and often lacking in support in vital comfort areas.

Most vehicle seats allow for adjustment along horizontal and vertical planes in order for an individual driving a vehicle to reach and properly grip the steering wheel. However, these seats often lack proper lateral support due to the mass production of such seats in the automobile industry. This is particularly inconvenient for individuals who are too large to comfortably fit into the mass produced seats or too slender to fit in the same seat.

In either case, the result is an unpleasant driving experience where the driver's attention is distracted from the road and focused on trying to become comfortable. Slender individuals may find themselves sliding left and right in their seat depending on how the road bends, which lessens their control of the vehicle. Larger individuals may find that their backs begin to hurt during long road trips because their seat is too tight and requires them to sit in a position that places unnecessary strain on their backs.

Accordingly, a need remains for an adjustable vehicle seat for providing lateral torso support in order to overcome the above-noted shortcomings. The present invention satisfies such a need by providing a vehicle seat that is comfortable, improves driver's safety, and is conveniently adjustable in design. Such a seat will advantageously keep a driver upright with its padded side supports instead of allowing the individual to slide laterally when taking a sharp turn. This will provide peace of mind for safety-conscious motorists and help prevent accidents. Everyday commuters, as well as truck drivers and owners of recreational vehicles who spend a lot of time on the road, will appreciate the beneficial characteristics of such an adjustable vehicle seat.

BRIEF SUMMARY OF THE INVENTION

In view of the foregoing background, it is therefore an object of the present invention to provide an adjustable vehicle seat. These and other objects, features, and advantages of the invention are provided by a vehicle seat for providing lateral torso support.

The seat includes a generally U-shaped support bracket secured to a vehicle floor panel and extending upwardly therefrom. A lower portion and an upper portion are connected thereto. Such an upper portion has a centrally disposed longitudinal axis oriented along a substantially upright plane. The upper portion includes a plurality of lateral wing portions equidistantly offset from the axis for defining a width of the upper portion. Each such wing portion includes an elongated rod extending along a longitudinal length thereof substantially parallel to the axis. The lower and upper portions further have an outer layer formed from resilient material and the wing portions have substantially similar shapes.

A mechanism is included for selectively pivoting the wing portions in sync about the respective rods such that the width of the upper portion can conveniently be adapted between compressed and relaxed positions for providing lateral support to a user during operating conditions. Such a pivoting mechanism extends between the lower and upper portions and is adjacent to a rear side of the seat.

The pivoting mechanism preferably includes a control panel electrically coupled to a power supply source. Such a control panel has a user interface for conveniently toggling the pivoting mechanism between various operating modes. A plurality of motors are electrically coupled to the control panel and operably connected to the rods respectively.

The pivoting mechanism further includes a plurality of brackets that have an aperture formed therein for receiving the rods such that the wing portions can advantageously be operably maneuvered when the rods are rotated in clockwise and counter clockwise directions during operating conditions. Such a support bracket preferably includes a plurality of oppositely facing platforms extending medially therefrom for supporting the rods at a fixed height. The brackets may be connected to the upper portion and the motors are secured to the lower portion. The apertures and the rods preferably have non-annular cross-sections respectively for assisting the rods to maintain continuous surface contact with the brackets.

The pivoting mechanism preferably further includes a rotary control knob and an elongated shaft operably connected thereto such that the shaft rotates when the knob is manually turned by a user. Such a shaft extends across a width of the lower portion and passes through a selected portion of the support bracket. The shaft includes a plurality of geared portions spaced along a length thereof. The rods each include lower end portions including a plurality of gear portions traversing the shaft gear portions that are operably engageable therewith such that the rods are advantageously caused to rotate along a vertical axis as the shaft is rotated along a horizontal axis.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
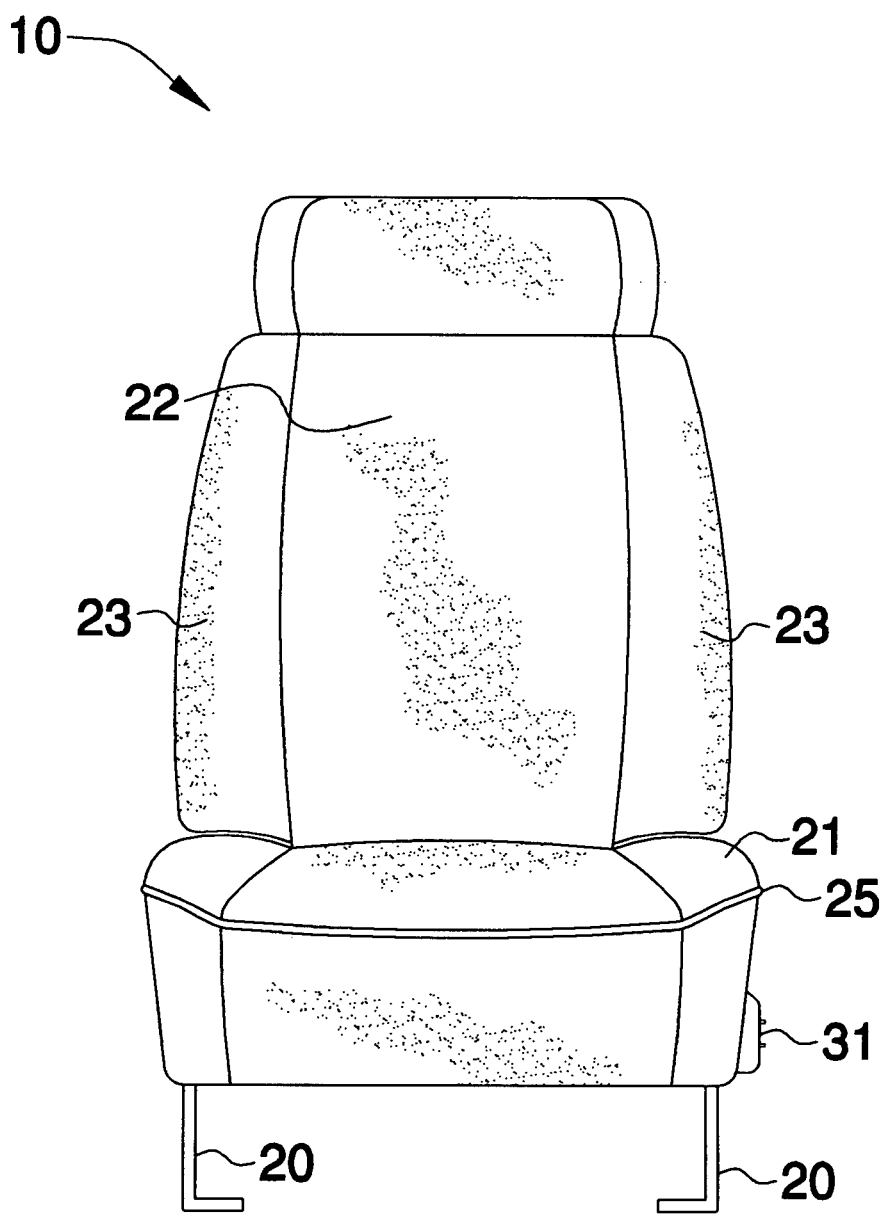
FIG. 1 is a front elevational view showing an adjustable vehicle seat for providing lateral support, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The device of this invention is referred to generally in FIGS. 1-7 by the reference numeral 10 and is intended to provide an adjustable vehicle seat. It should be understood that the device 10 may be used to provide support in many different types of vehicles and should not be limited to use in only small cars.

Figure 3:
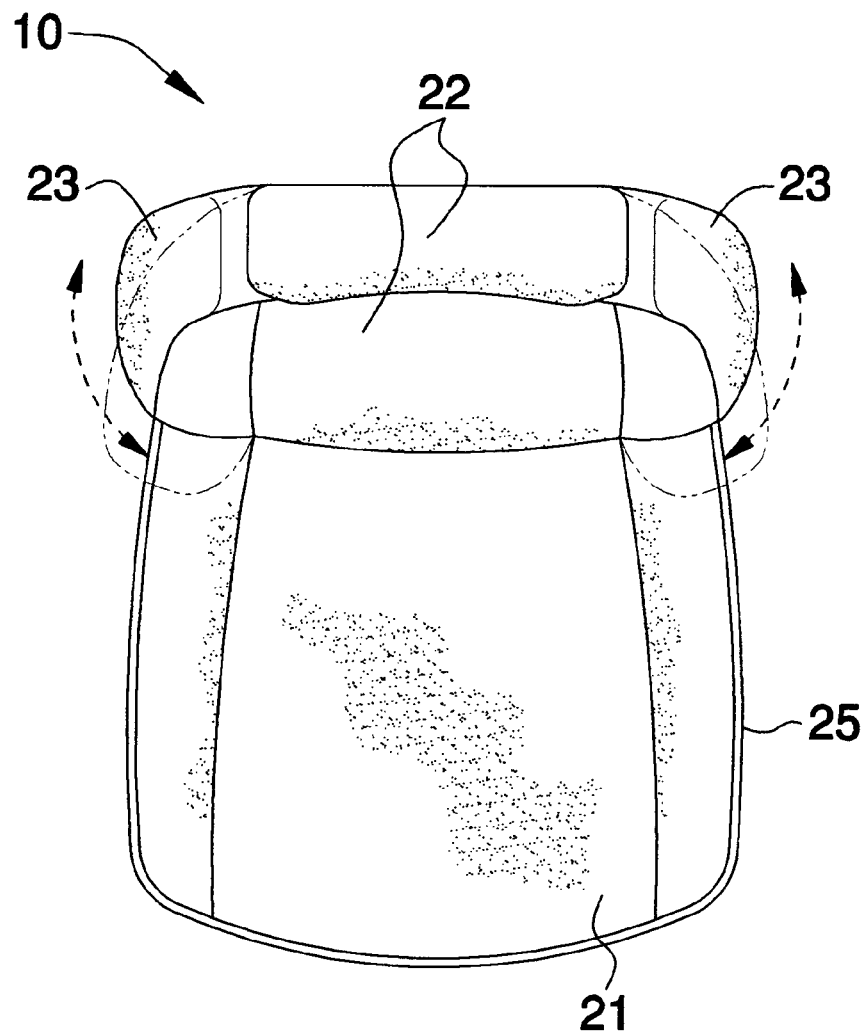
FIG. 3 is a top plan view of the seat shown in FIG. 1 illustrating the lateral movement of the wing portions.

Referring initially to FIGS. 1 and 3, the device 10 includes a generally U-shaped support bracket 20 secured to a vehicle floor panel and extending upwardly therefrom. A lower portion 21 and an upper portion 22 are connected thereto. Such an upper portion 22 has a centrally disposed longitudinal axis oriented along a substantially upright plane. The upper portion 22 includes a plurality of lateral wing portions 23 equidistantly offset from the axis for defining a width of the upper portion 22. Each such wing portion 23 includes an elongated rod 24 extending along a longitudinal length thereof substantially parallel to the axis. The lower 21 and upper 22 portions further have an outer layer 25 formed from resilient material and the wing portions 23 have substantially similar shapes. Such an outer layer 25 effectively covers the pivoting mechanism 30 (described herein below) while also providing a comfortable surface for the driver to sit on.

Figure 4:
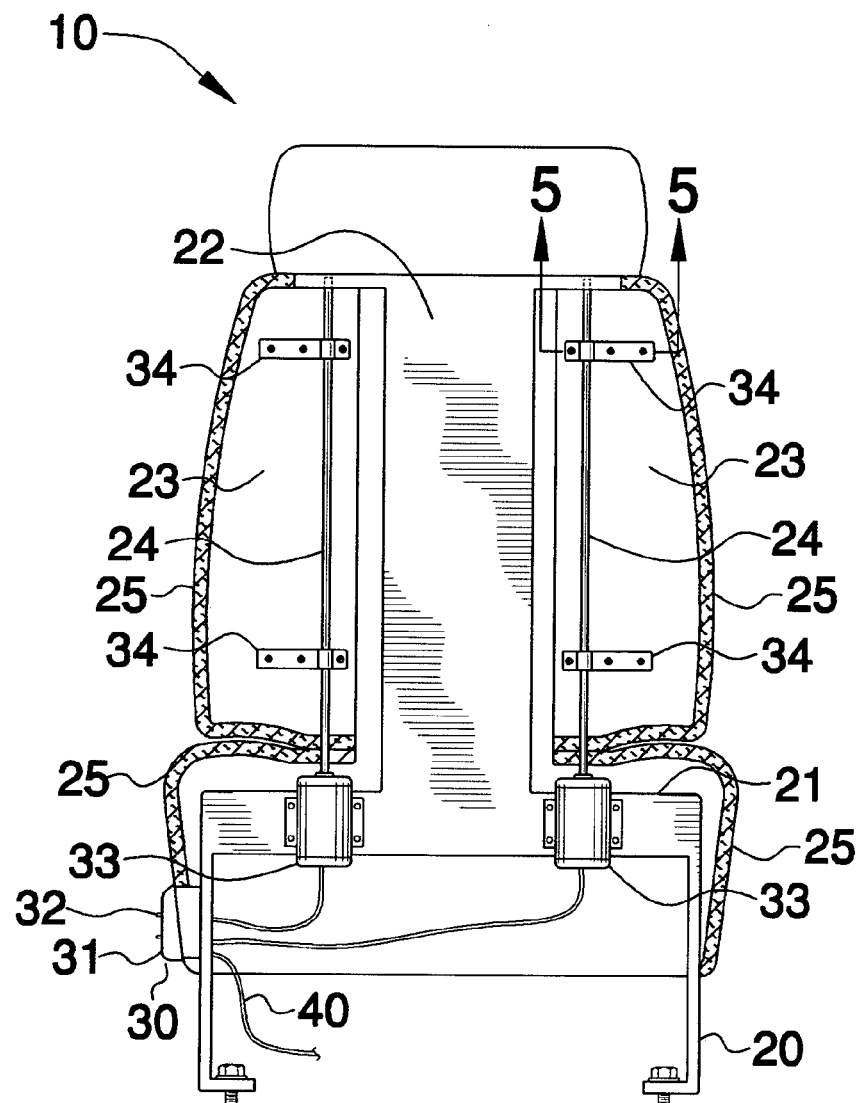
FIG. 4 is a cross-sectional view of the seat shown in FIG. 3, taken along line 4-4.

Referring to FIG. 4, a mechanism 30 is included for selectively pivoting the wing portions 23 in sync about the respective rods 24 such that the width of the upper portion 22 can conveniently be adapted between compressed and relaxed positions for providing lateral support to a user during operating conditions. This feature allows drivers of varying body sizes to all fit comfortably in the same seat 10 without compromising their driving ability. The pivoting mechanism 30 thus increases driver awareness which results in safer driving practices. Such a pivoting mechanism 30 extends between the lower 21 and upper 22 portions and is adjacent to a rear side of the seat 10.

Figure 2:
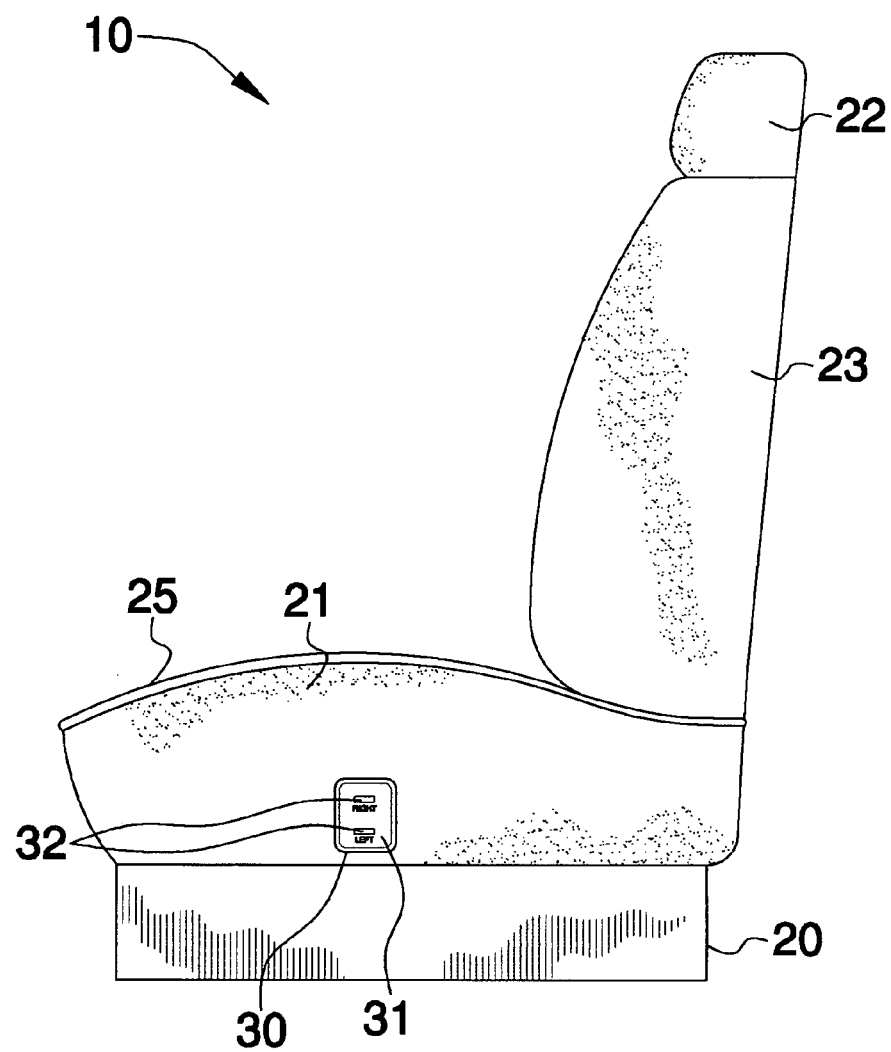
FIG. 2 is a side elevational view of the seat shown in FIG. 1.

Referring to FIGS. 2 and 4, the pivoting mechanism 30 includes a control panel 31 electrically coupled to a power supply source 40. Such a control panel 31 has a user interface 32 for conveniently toggling the pivoting mechanism 30 between various operating modes. Quick adjustments can be made to the width of the seat 10 with such an automated pivoting mechanism to accommodate many different individuals. A plurality of motors 33 are electrically coupled to the control panel 31 and operably connected to the rods 24 respectively.

Figure 5:
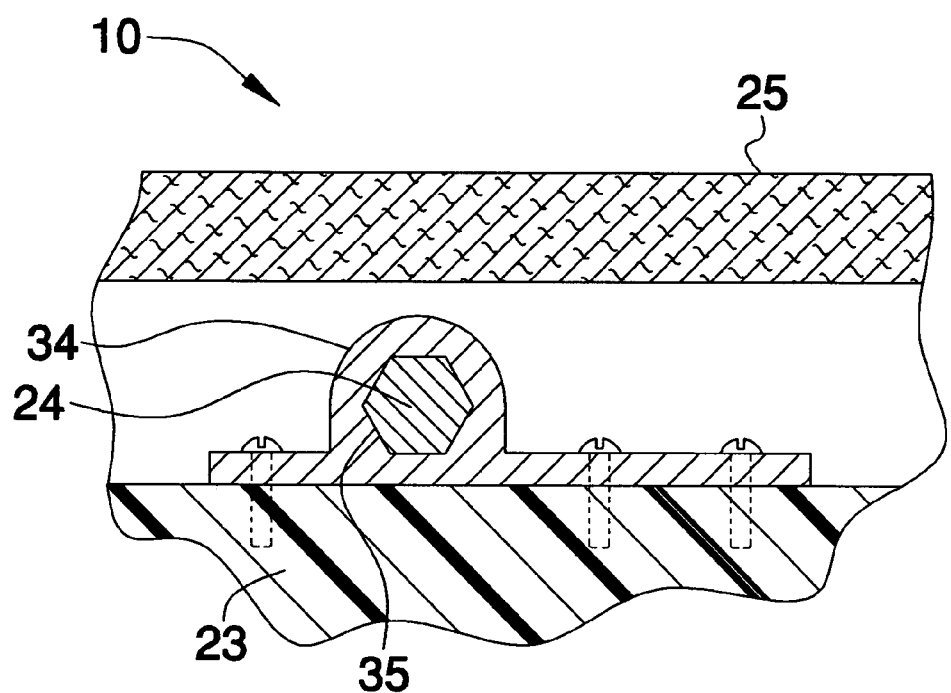
FIG. 5 is cross-sectional view of the seat shown in FIG. 4, taken along line 5-5.
Figure 6:
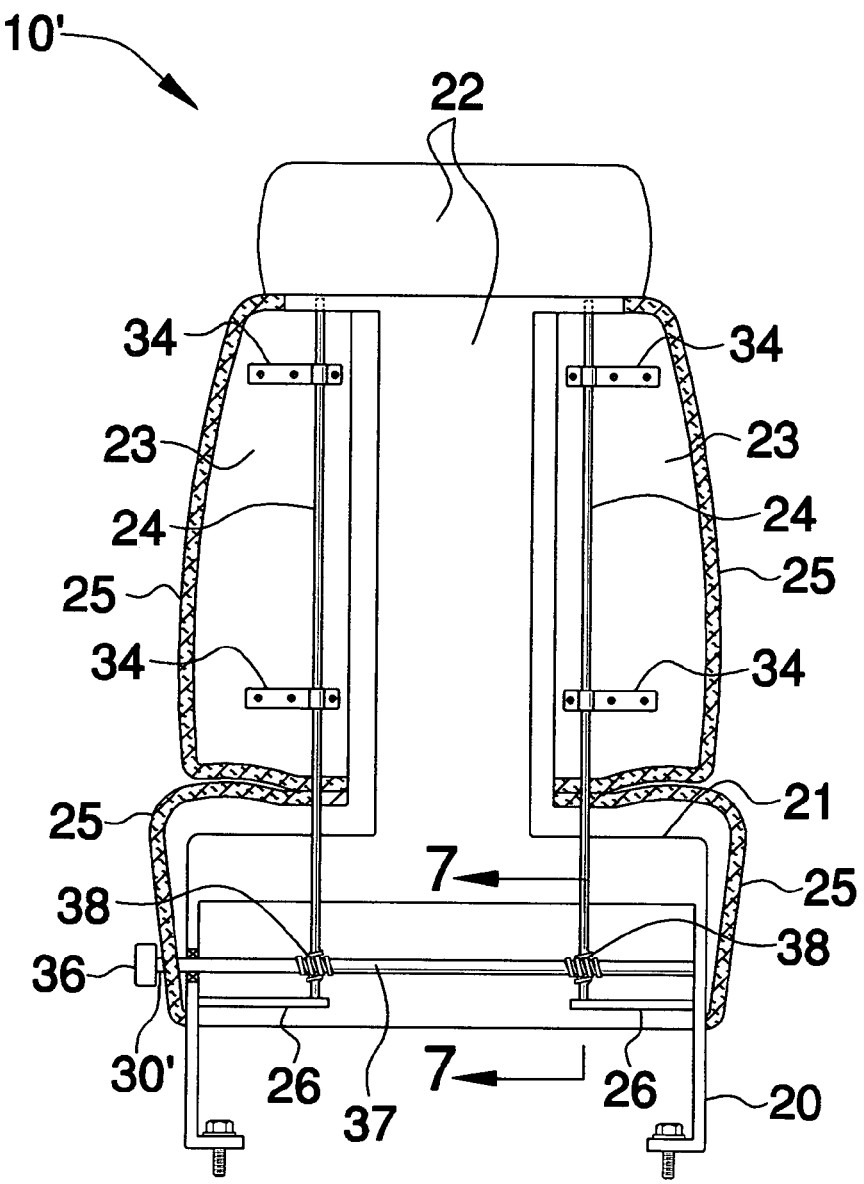
FIG. 6 is a cross-sectional view of the seat shown in FIG. 4, showing the plurality of rods.

Referring to FIGS. 4, 5 and 6, the pivoting mechanism 30 further includes a plurality of brackets 34 that have an aperture 35 formed therein for receiving the rods 24 such that the wing portions 23 can advantageously be operably maneuvered when the rods 24 are rotated in clockwise and counter clockwise directions during operating conditions. The brackets 34 are connected to the upper portion 22 and the motors 33 are secured to the lower portion 20. The apertures 35 and the rods 24 have non-annular cross-sections respectively for assisting the rods 24 to maintain continuous surface contact with the brackets 34.

Figure 7:
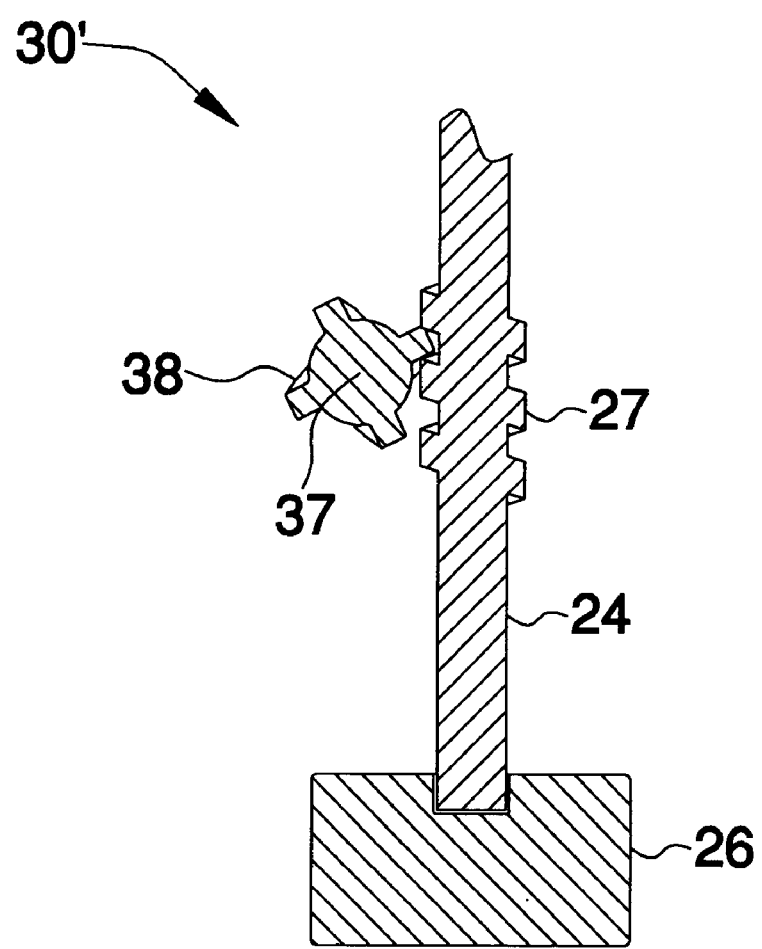
FIG. 7 is a cross-sectional view of the rods shown in FIG. 6, taken along line 7-7.

Referring to FIGS. 6 and 7, in an alternate embodiment 10', the pivoting mechanism 30' includes a rotary control knob 36 and an elongated shaft 37 operably connected thereto such that the shaft 37 rotates when the knob 36 is manually turned by a user. Such a shaft 37 extends across a width of the lower portion 21 and passes through a selected portion of the support bracket 20. Such a support bracket 20 includes a plurality of oppositely facing platforms 26 extending medially therefrom for supporting the rods 24 at a fixed height. Such a pivoting mechanism 30' is advantageously less expensive to install while still being just as effective as the motor 33 driven pivoting mechanism 30.

The affordability of the pivoting mechanism 30' increases the size of the market for this feature and gives more people an opportunity to purchase it. The shaft 37 includes a plurality of geared portions 38 spaced along a length thereof. The rods 24 each include lower end portions including a plurality of gear portions 27 traversing the shaft gear portions 38 that are operably engageable therewith such that the rods 24 are advantageously caused to rotate along a vertical axis as the shaft 37 is rotated along a horizontal axis.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle seat for providing lateral torso support, said seat comprising:

a support bracket secured to a vehicle floor panel and extending upwardly therefrom;

a lower portion and an upper portion connected thereto, said upper portion having a centrally disposed longitudinal axis oriented along a substantially upright plane, said upper portion comprising a plurality of lateral wing portions equidistantly offset from the axis for defining a width of said upper portion, each said wing portion including an elongated rod extending along a longitudinal length thereof and substantially parallel to the axis; and means for selectively pivoting said wing portions about said respective rods such that the width of said upper portion can be adapted between compressed and relaxed positions for providing lateral support to a user during operating conditions, said pivoting means extending between said lower and upper portions and adjacent a rear side of said seat;

wherein said pivoting means comprises a control panel electrically coupled to a power supply source, said control panel having a user interface for toggling said pivoting means between various operating modes;

a plurality of motors electrically coupled to said control panel and operably connected to said rods respectively; and a plurality of brackets having an aperture formed therein for receiving said rods such that said wing portions can be operably maneuvered when said rods are rotated in clockwise and counter clockwise directions during operating conditions;

wherein said brackets are connected to said upper portion and said motors are secured to said lower portion.

2. The vehicle seat of claim 1, wherein the apertures and said rods have non-annular cross-sections respectively for assisting said rods to maintain continuous surface contact with said brackets.

3. A vehicle seat for providing lateral torso support, said seat comprising:

a support bracket secured to a vehicle floor panel and extending upwardly therefrom;

a lower portion and an upper portion connected thereto, said upper portion having a centrally disposed longitudinal axis oriented along a substantially upright plane, said upper portion comprising a plurality of lateral wing portions equidistantly offset from the axis for defining a width of said upper portion, each said wing portion including an elongated rod extending along a longitudinal length thereof and substantially parallel to the axis, said lower and upper portions further having an outer layer formed from resilient material, said wing portion having substantially similar shapes; and means for selectively pivoting said wing portions about said respective rods such that the width of said upper portion can be adapted between compressed and relaxed positions for providing lateral support to a user during operating conditions, said pivoting means extending between said lower and upper portions and adjacent a rear side of said seat;

wherein said pivoting means comprises a control panel electrically coupled to a power supply source, said control panel having a user interface for toggling said pivoting means between various operating modes;

a plurality of motors electrically coupled to said control panel and operable connected to said rods respectively; and a plurality of brackets having an aperture formed therein for receiving said rods clockwise and counter clockwise directions during operating conditions;

wherein said brackets are connected to said upper portion and said motors are secured to said lower portion.

4. The vehicle seat of claim 3, wherein the apertures and said rods have non-annular cross-sections respectively for assisting said rods to maintain continuous surface contact with said brackets.

5. A vehicle seat for providing lateral torso support, said seat comprising:

a generally U-shaped support bracket secured to a vehicle floor panel and extending upwardly therefrom;

a lower portion and an upper portion connected thereto, said upper portion having a centrally disposed longitudinal axis oriented along a substantially upright plane, said upper portion comprising a plurality of lateral wing portions equidistantly offset from the axis for defining a width of said upper portion, each said wing portion including an elongated rod extending along a longitudinal length thereof and substantially parallel to the axis, said lower and upper portions further having an outer layer formed from resilient material, said wing portion having substantially similar shapes; and means for selectively pivoting said wing portions in sync about said respective rods such that the width of said upper portion can be adapted between compressed and relaxed positions for providing lateral support to a user during operating conditions, said pivoting means extending between said lower and upper portions and adjacent a rear side of said seat;

wherein said pivoting means comprises a control panel electrically coupled to a power supply source, said control panel having a user interface for toggling said pivoting means between various operating modes;

plurality of motors electrically coupled to said control panel and operably connected to said rods respectively; and a plurality of brackets having an aperture formed therein for receiving said rods such that said wing portions can be operably maneuvered when said rods are rotated in clockwise and counter clockwise directions during operating conditions;

wherein said brackets are connected to said upper portion and said motors are secured to said lower portion.

6. The vehicle seat of claim 5, wherein the apertures and said rods have non-annular cross-sections respectively for assisting said rods to maintain continuous surface contact with said brackets.

* * * * *